(12) United States Patent
Chene et al.

(10) Patent No.: US 6,168,341 B1
(45) Date of Patent: Jan. 2, 2001

(54) DEVICE FOR PROTECTING AND GUIDING AN ELONGATE PART CONNECTED VIA A HINGE TO TWO MUTUALLY HINGED RIGID ELEMENTS, AND INDUSTRIAL APPLICATIONS THEREOF

(76) Inventors: Richard C. Chene, 137 boulevard Koenig - 92200, Neuilly sur Seine (FR); Dominique V. Delamour, 44 rue de la Milliére - 78490, Les Mesnuls (FR); Olivier J. Rodi, 2 rue de l 'Eglise - 78650, Saulx-Marchais (FR)

( * ) Notice: Under 35 U.S.C. 154(b), the term of this patent shall be extended for 0 days.

(21) Appl. No.: 09/142,209

(22) PCT Filed: Mar. 14, 1997

(86) PCT No.: PCT/FR97/00460

§ 371 Date: Sep. 3, 1998

§ 102(e) Date: Sep. 3, 1998

(87) PCT Pub. No.: WO97/35085

PCT Pub. Date: Sep. 25, 1997

(30) Foreign Application Priority Data

Mar. 15, 1996 (FR) .................................................. 96 03271

(51) Int. Cl.[7] ...................................................... F16D 1/00
(52) U.S. Cl. ................................ 403/76; 403/57; 403/74; 403/78; 403/123; 403/128; 403/164; 16/228; 16/286; 351/153
(58) Field of Search ............................ 16/228, 334, 286; 351/153, 121, 119, 111; 403/57, 74, 79, 128, 122, 157, 164, 123

(56) References Cited

U.S. PATENT DOCUMENTS

| 1,834,609 | * | 12/1931 | Fitts | .......................................... 16/78 |
| 2,117,148 | * | 5/1938 | Clark | ....................................... 16/281 |
| 4,004,771 | * | 1/1977 | Plevak et al. | ..................... 403/123 X |
| 4,677,708 | * | 7/1987 | Streett | .................................... 16/334 |
| 4,750,828 | * | 6/1988 | Sartor | ................................. 16/325 X |
| 4,932,771 | * | 6/1990 | Nowottny | .............................. 351/113 |
| 5,009,495 | * | 4/1991 | Williams | ............................ 16/228 X |
| 5,109,321 | * | 4/1992 | Maglica et al. | .................. 403/122 X |
| 5,115,540 | * | 5/1992 | Delorme | ........................... 351/153 X |
| 5,394,297 | | 2/1995 | Toedter . | |

FOREIGN PATENT DOCUMENTS

| WO 94/11606 | 5/1994 | (EP) . |
| WO 92/15916 | 9/1992 | (WO) . |

\* cited by examiner

*Primary Examiner*—Terry Lee Melius
*Assistant Examiner*—Danielle Somrak
(74) *Attorney, Agent, or Firm*—Young & Thompson

(57) ABSTRACT

A device for use with a hinge in which two rigid elements (104, 105) may be placed in various relative angular positions, wherein the elongate part (109) to be protected and guided consists of a section or tube inserted through two mutually facing channels (111, 110) in respective ones of the rigid elements (104, 105). The device includes a movable member (107) arranged between said rigid elements (104, 105) and at least rotatably movable about a rotational axis of said hinge. The member further includes a hole (108) through which said elongate part (109) may inserted.

11 Claims, 4 Drawing Sheets

DEVICE FOR PROTECTING AND GUIDING AN ELONGATE PART CONNECTED VIA A HINGE TO TWO MUTUALLY HINGED RIGID ELEMENTS, AND INDUSTRIAL APPLICATIONS THEREOF

Device for protecting and guiding an elongate part connected via a hinge to two mutually hinged elements, and industrial applications thereof.

CROSS REFERENCE TO RELATED APPLICATION

This is the 35 USC 371 national stage of international application PCT/FR97/00460 filed on Mar. 14, 1997 which designated the United States of America.

FIELD OF THE INVENTION

The present invention relates to a system for protecting and guiding an elongate component, such as a filament or a tube, attached, in the vicinity of the joint, to two rigid elements hinged to each other, and industrial applications of this system.

Specifically, the invention relates to such a system in which the rigid elements are connected to each other by a hinge enabling them to occupy different relative angular positions and in which the elongate component is laid along two successive channels positioned end-to-end and formed one in each of the rigid elements.

BACKGROUND OF THE INVENTION

Many technical fields employ hinges designed to allow two rigid elements to pivot about at least one pivot point and thus occupy different relative angular positions. These hinges may take the form of, for example, metal hinges, extensible joints, ball joints, universal joints, etc. In some applications it may also be necessary to establish an electrical, hydraulic, pneumatic, optical or mechanical connection between the rigid elements, for example in order to transmit some kind of command, signal, power, force or information from one rigid element to the other. Thus, in the automotive industry, it is sometimes desirable to pass electrical wiring between the doorframe of a vehicle and the door hinged to this frame in order to power a motor and adjust the angle of the wing mirrors in response to a signal transmitted from the interior. Clearly, this electrical wiring must neither interfere with the smooth operation of the hinge nor risk being damaged by it.

In the systems of the prior art, the passing of such wiring or other elongate components from one rigid element to the other is generally done in one of two ways: passing it directly through the hinge, or passing it through a boot independent of the joint.

Direct passage is illustrated by international patent application WO 92/15916 which discloses an extensible or elastic hinge comprising two rigid elements which have complementary bearing faces and are capable of pivoting relative to each other about a physical hinge pin or geometrical axis of rotation. A passage designed to take one end of an elongate elastic connecting element, capable of transmitting a force, is provided in each of the two rigid elements. Another example of an elastic hinge is disclosed in European patent application No. 0,689,634 in the name of Chene et al, in which the above general characteristics are also found. The disadvantage with these systems is that the surfaces of the hinges in contact with the elongate component must be perfectly smooth and have no sharp edges, in order to prevent premature wear of the component. This necessitates expensive and complicated operations which affect the costs of manufacture of these joints.

In prior art systems using a boot, the boot gives some protection to the elongate component, but it has nonetheless been found that this protection is insufficient inasmuch as the danger of pinching, shearing or cutting through the component is not negligible. There are moreover certain constraints involved in this technique, in that when using a boot it is necessary not only to prepare a certain number of holes by which to fix it to the two rigid elements, but also to adjust the maximum degree of expansion of the boot to the maximum angle of opening of the joint.

SUMMARY OF THE INVENTION

The invention solves the above disadvantages of the prior art in that it provides a system for protecting and guiding an elongate component, in which a movable member is situated between the rigid elements of the joint, which member can at least be rotated about an axis of rotation of the joint and contains a passage suitable for accommodating the elongate component.

A movable member of the above mentioned general type is known from U.S. Pat. No. 5,394,297 which discloses a rotatable bushing between a display screen and a portable computer keyboard.

The function of the movable member is to guide the elongate component, in order, for example, to prevent it from interfering with an adjacent hinge, if any, or, in the case of extensible hinges, to direct the transmitted force. Furthermore its rotational mobility allows it to position itself with respect to the elongate component, so providing better control of the radius of curvature of the elongate component in the vicinity of the movable member and consequently reducing the likelihood of the component's becoming kinked undesirably along its length. In a preferred embodiment of the invention, this likelihood can be still further reduced by giving the passage formed in the movable member a configuration such that each of its open ends has a radius of curvature that is at most equal to the minimum radius of curvature of the elongate component in the vicinity of the end. For example, the movable member may contain an essentially cylindrical passage which is flared out at its open ends. Alternatively, and in a preferred embodiment of the invention, the passage formed in the movable member may be shaped essentially like the inner part of a torus, of circular or elliptical cross-section, the meridian circles of which have a radius that is at most equal to the minimum radius of curvature of the elongate component in the vicinity of the open ends of the passage.

In addition, in order to prevent wear of the elongate component where it contacts the inside walls of the movable member, the member must be composed of a material offering minimal roughness, such as a ceramic, a polished metal or the like.

The movable member is preferably free to move in a plane parallel to a plane of rotation of the joint, or even in two orthogonal planes each of which is parallel to a plane of rotation of the joint.

The channels formed in the two rigid elements advantageously each open into a cavity formed in the ends, of the rigid elements, which cavities are opposite each other, and the ends have mating forms, so that, when the rigid elements are engaged with each other, the mating forms of their ends fit together, and the movable member fits inside the ends. In this way it is possible to give the rigid elements a stable relative angular position. Other such positions may be obtained, for example by so configuring the ends of the rigid elements as to produce a cam action during the relative angular movement of the elements in a plane of rotation of the joint.

Also, at least one of the rigid elements may be provided with stop means that limit the relative angular movements of the elements in at least one plane of rotation of the joint, e.g. as far as an unstable relative angular position.

The elongate component may be solid or hollow. It may be a filament or a tube composed of an inelastic flexible material associated with at least one elastic part, such as a helical spring, the filament or tube being immobilized by stop parts provided one in each of the rigid elements. According to another possibility, the elongate component may be an elastic filament, each of whose ends is anchored in one of the rigid elements. Thus, the elongate component may take the form of, among other things, a yarn, wire, cord, hose or the like, which may be braided, twisted, stranded and/or sheathed. Tubular means of transmission are designed to establish, for example, an electrical, hydraulic, pneumatic or optical connection, whereas elongate components in filament form can be used to transmit a mechanical force such as an elastic force from one rigid element to the other.

In the light of the above, it will be readily appreciated that the system according to the invention can be fitted to conventional hinges having a physical point of pivoting represented by a pin, a dowel, a bolt, an axle in one or more parts, or the like, or it may itself form a joint with a purely geometrical point of pivoting—resulting from the contact between the mutually opposing faces—especially where the elongate component has elastic properties.

The scope of the invention also extends to certain preferred industrial applications of the above-mentioned system. The invention thus relates also to a spectacle frame incorporating such a system, in which, for example, the rigid elements are respective integral parts of a spectacle frame temple and of a spectacle frame front. In another application the system according to the invention is integrated with a door hinge. For example, the rigid elements are respective integral parts of a vehicle door and doorframe.

It should be noted however that the invention is also applicable to many other technical fields, for example the making of joints for prostheses and industrial robot components, although these applications are not exhaustive. It will be obvious too that in all these uses the rigid elements may either be integral with those parts of the object that are hinged with respect to each other, or be mounted on, or in, these parts.

BRIEF DESCRIPTION OF THE DRAWINGS

A fuller explanation of the invention will be found in the following detailed description of certain non-restrictive embodiments of the invention. This description should be taken in combination with the accompanying drawings in which.

DETAILED DESCRIPTION OF THE INVENTION

Figure 1:
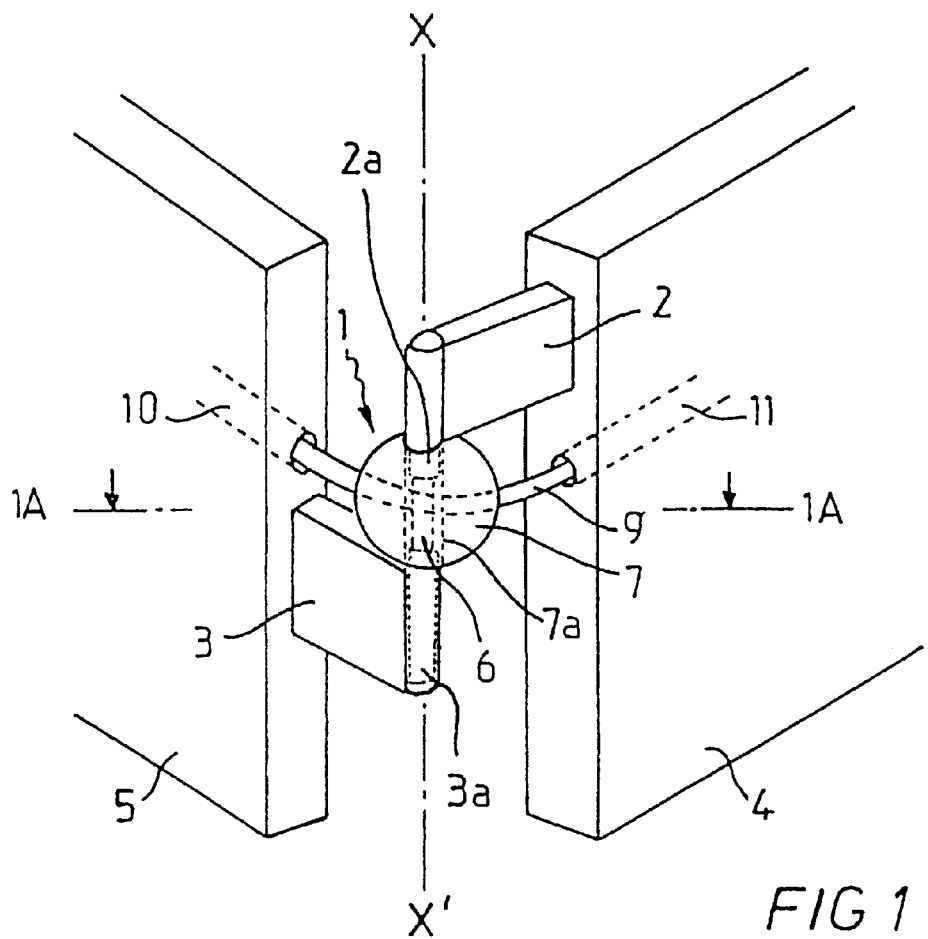
FIG. 1 is a perspective view of one embodiment of the system according to the invention as applied to a conventional hinge.

If reference is made initially to FIG. 1, a system 1 according to the invention can be seen here applied to a conventional hinge. This hinge comprises, in a manner known per se, two rectangular leaves 2 and 3 that project from a first rigid element 4 and a second rigid element 5, respectively, each leaf 2, 3 being in the plane of the respective rigid element 4, 5 to which it is attached. Each leaf 2, 3 has at its free end a socket 2a and 3a, respectively. The two leaves 2, 3 are hinged to each other by means of a dowel 6, of which one end is pushed into and immobilized permanently in the socket 2a while the other end is received in the socket 3a, the other end, which projects vertically down (as viewed in the figure) being able to turn freely about its longitudinal axis X, X' in the socket 3a.

The hinge also has a spherical member 7 situated between the leaves 2 and 3 and containing a passage 7a.

The two sockets 2a, 3a extend part of the way through the spherical member 7 by entering the passage 7a, without being in any way fixed to the member, whether by crimping, bonding, screwing or any other means. It follows that the member 7 is able to rotate about the axis of rotation X–X' of the dowel 6 which joins together the sockets 2a and 3a, and therefore the hinge in general.

Figure 1A:
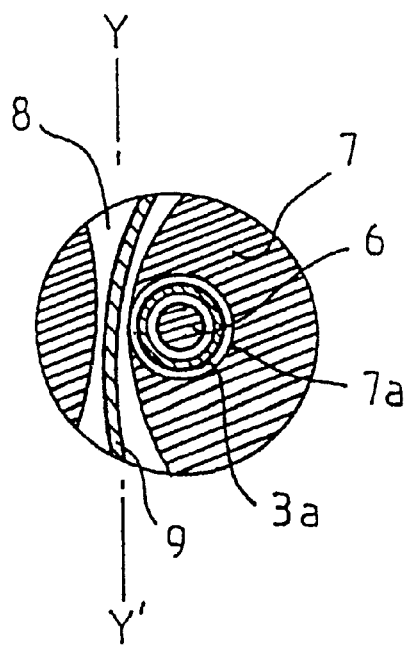
FIG. 1A is a schematic cross-section, on a larger scale, of the movable member of the above system, taken on plane 1A—1A as marked in FIG. 1.

As can be seen more clearly in FIG. 1A, which shows diagrammatically the movable spherical member 7 in cross-section, the socket 3a and the dowel 6 are concentric and are housed in the passage 7a which runs approximately through the center of the movable member 7. The movable member 7 additionally has a passage 8 whose longitudinal axis Y, Y' is orthogonal to the axis X, X'. The passage 8 is roughly cylindrical and its two open ends are flared out. An elongate component 9, such as an electric wire, runs through the passage 8 and projects out from either side of the passage into the channels 11, 10 formed in the thickness of the rigid elements 4 and 5, respectively.

It can be seen that the passage 8 gives efficient protection to the elongate component 9 against the danger of being sheared or cut through, etc. by keeping it away from the components of the hinge. Furthermore, the configuration of the passage 8 is such that its flared ends have a curvature which is at least equal to the maximum curvature of which the elongate component 9 is capable in the vicinity of the ends when the hinge is pivoted. This particular configuration of the passage 8, and the rotary mobility of the movable member 7 give further protection to the elongate component 9, in the sense that they prevent the formation of acute angles along the length of the elongate component 9.

It will be observed that the configuration illustrated is only one embodiment of the invention and that different variants can be envisaged. In particular the assembly formed by the sockets 2a, 3a and dowel 6 may be replaced by a combination of two half-pins attached to the respective leaves 2 and 3, with two pin supports each mounted on the movable member 7 so as to be opposite the corresponding half-pin. In this embodiment, the two half-pins should not be crimped, bonded, screwed or fastened in any other way to their supports, in order that the member 7 can still rotate. Moreover, in this configuration the passage 8 can pass through the center of the movable member 7 and may, for example, be shaped like the inner part of a torus.

Figure 2:
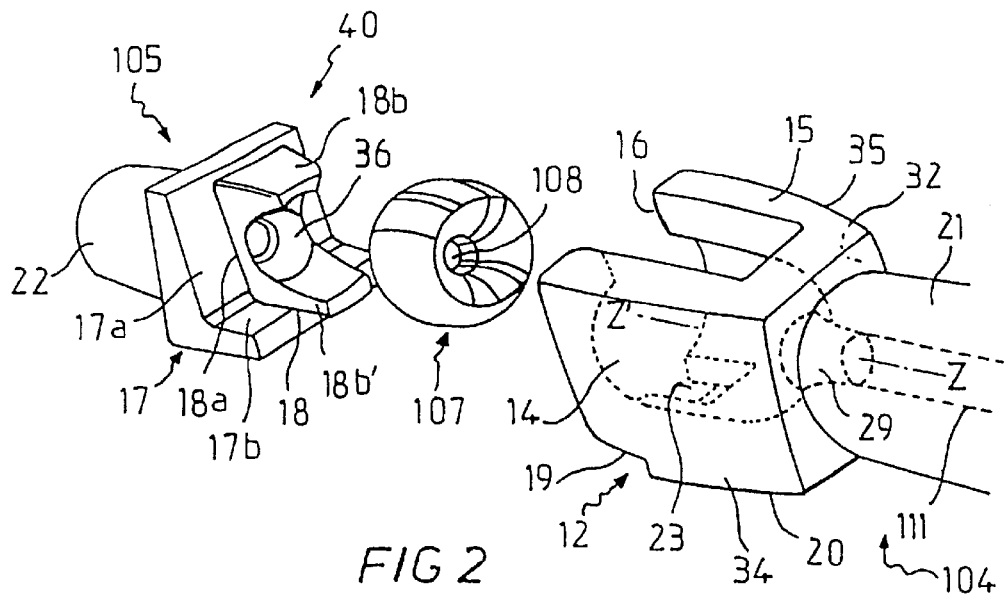
FIG. 2 is an exploded perspective view of another embodiment of the system according to the invention, as applied to an extensible joint.

FIG. 2 shows another embodiment of the system according to the invention as applied to an extensible joint; in this system, parts corresponding to parts described earlier with regard to FIGS. 1 and 1A will be identified by identical reference numbers augmented by the value 100. In the text that follows, the term "distal" will be applied to any part of a component that is further from the movable member than another, or "proximal" part of that component.

The system illustrated is applied to a joint between a first rigid element 104 and a second rigid element 105.

Specifically, in this figure the rigid element 104 includes a distal part 21 of cylindrical section and a proximal part 12. The proximal part 12 is roughly in the shape of a parallelepiped, the cross-section of the proximal part 12 having larger dimensions than the distal part 21. However, the proximal part 12 and distal part 21 of the element 104 can of course be of similar general configuration and dimensions, in cross-section. An approximately cylindrical cavity 14 is formed in the proximal part 12, the main axis Z–Z' of the cavity being approximately in line with the longitudinal axis of the distal part 21. The cavity 14 is open both on the upper face 15 of the parallelepiped and on its lateral face 16 furthest from the distal part 21. The cavity 14 forms a constriction 29 at the junction between the distal part 21 and the proximal part 12 of the element 104 and this constriction 29 leads into a longitudinal channel 111 formed within the thickness of the distal part 21 of the element 104.

The rigid element 105 also has a distal part 22 of generally cylindrical form and a proximal part 40. The proximal part 40 comprises two parts, one of which is L-shaped and is denoted by the numeral 17 and the other U-shaped and denoted by the numeral 18.

More specifically, the part 17, whose dimensions are larger than the distal part 22, has in profile the form of an "L" in which the vertical bar (as viewed in FIG. 2) forms a main rectangular wall 17a which follows on from the radial surface of the distal part 22, and in which the horizontal bar is formed by a secondary rectangular wall 17b at right angles to the main wall 17a and having a longitudinal edge in common with the latter.

The part 18 forms a bowl and in profile is U-shaped with a planar base 18a and arms denoted 18b and 18b'. The outer surface of the arms 18b and 18b' is planar. The base 18a, or rectangular bottom of the bowl 18, constitutes an extension of the main wall 17a, while the wing 18b' of the bowl constitutes an extension of the secondary wall 17b, with the arm 18b' projecting beyond the secondary wall. The bowl 18 defines a cavity 36 with an open base.

Figure 3:
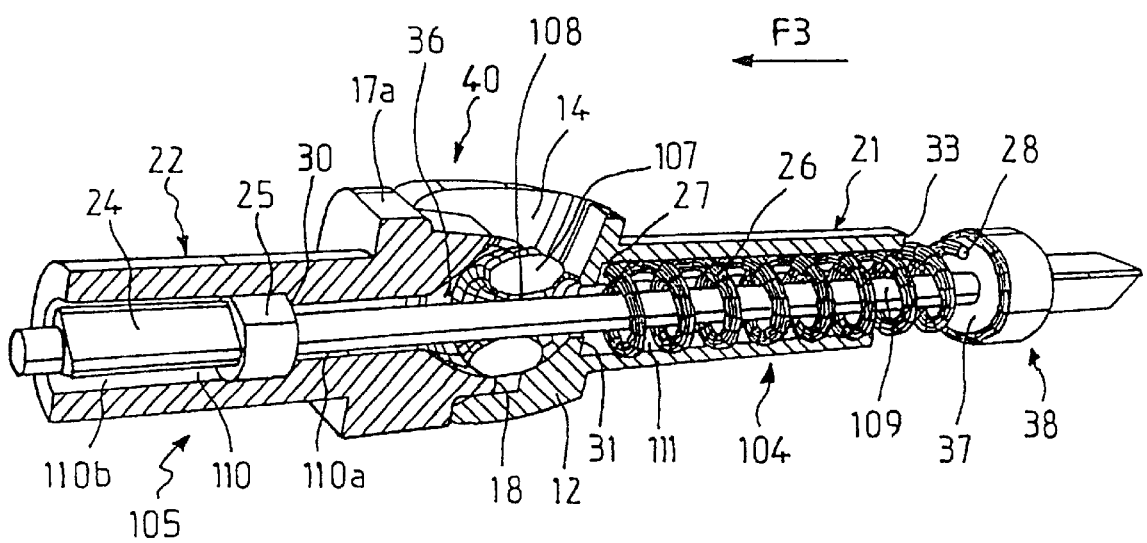
FIG. 3 is a perspective view, partly in section, of the system shown in FIG. 2 as applied to a spectacle hinge, with the temple in the normal open position, that is to say at 90°.

As can be seen in FIG. 3, a longitudinal channel 110, incorporating a proximal zone 110a and a distal zone 110b of greater diameter, is formed in the rigid element 105 and, at its emergence from the main wall 17a of the proximal part 17, opens into the bowl 18.

Returning to FIG. 2, the rigid elements 104 and 105 are designed to come into mutual engagement, the secondary wall 17b of the proximal part 40 fitting into a cutout 19 formed in the lower face 20 of the proximal part 12, while that part of the arm 18b' of the bowl 18 which projects beyond the secondary wall 17b is designed to be received in a recess 23 in the lateral face 16 of the proximal part 12.

The system according to the invention includes a movable member 107 which is shaped externally like an ellipsoid and contains a passage 108 which is shaped essentially like the inner part of a torus.

As FIG. 3 shows, when the mating proximal parts 12 and 40 of the rigid elements 104 and 105 are in mutual engagement, the movable member 107 can be housed partly in the cavity 36 of the bowl 18 belonging to the element 105 and partly in the cylindrical cavity 14 of the element 104, and the passage 108 formed through the element 107 can be lined up with the longitudinal channels 111 and 110 formed inside the rigid elements 104 and 105. An elongate component 109 is laid along the longitudinal channel 110 formed inside the rigid element 105, through the cavity 36 formed at the end of the element, through the passage 108 of the movable member 107, through the constriction 29 formed in the rigid element 104 and along the longitudinal channel 111 formed inside the element.

Although, in the embodiment illustrated in FIG. 3, the movable member 107 is in contact with the inside walls of the bowl 18, it is obvious that, if wished, there may be a gap between them. It should also be noted that, in another relative angular position of the rigid elements 104 and 105, the movable member 107 may be outside of the cavities 14 and 36, or may be entirely contained within the cavity 14.

If reference is made more particularly to FIG. 3, which shows a system according to the invention as applied to an extensible hinge for a spectacle frame, in the normal open position of the temple, it will be seen that the elongate component 109 which it is designed to protect consists of a flexible filament associated with a spring 26. The filament 109, which is inelastic, is under tension. The ends of the filament 109 are gripped, or otherwise immobilized, in stop parts 24 and 38. On the stop part 24 is an enlarged portion 25 designed to abut against a shoulder 30 formed at the proximal end of the distal zone 110b of the channel 110. On the stop part 38 is a surface 37 forming an end-of-travel stop designed to abut against the free end 33 of the distal part 21 of the element 104. The distal end 28 of the spring 26 presses against the surface 37 of the stop part 38 and the other end 27 of the spring abuts against a shoulder 31 formed at the proximal end of the channel 111.

The operation of the spectacle-frame hinge described above will now be explained with reference to FIGS. 4 to 7. In the remainder of the description it will be assumed that element 104 forms part of a spectacle temple and element 105 belongs to a spectacle frame front, although the invention applies equally to the reverse situation, and indeed to any form of use of an extensible hinge.

Figure 4:
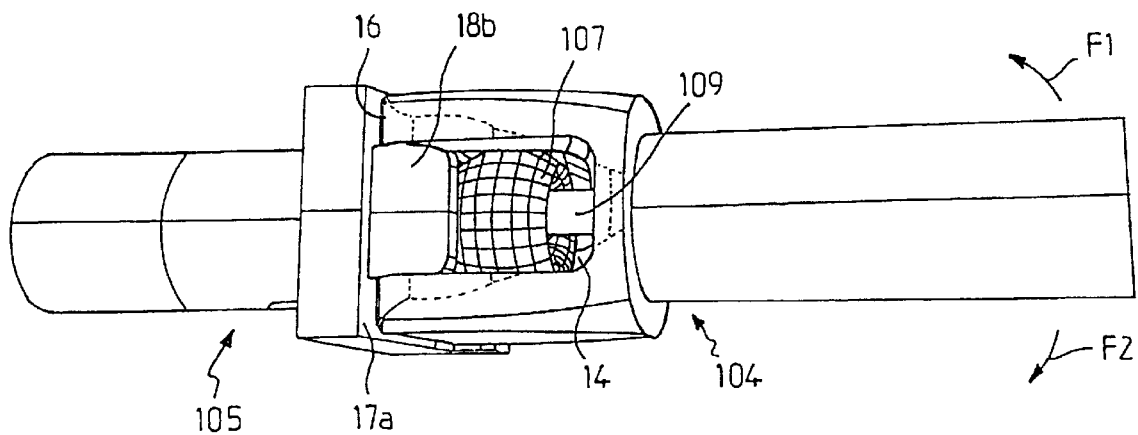
FIG. 4 is a perspective view of the top of the system shown in FIG. 3.
Figure 5:
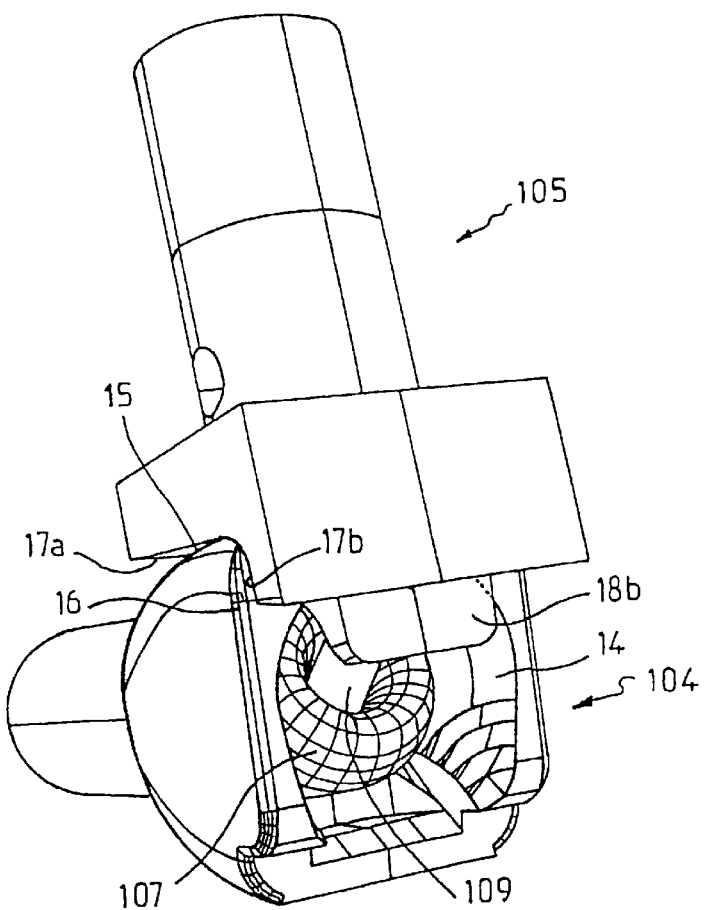
FIG. 5 is a perspective view of the system shown in FIG. 3, with the temple in the closed position.

FIG. 4 shows the hinge when the temple is in the normal open position, corresponding to the position illustrated in FIG. 3. As can be seen, when the rigid elements 104 and 105 are aligned and engaged with each other, the arm 18b of the bowl 18 protrudes into the cavity 14 formed inside the rigid element 104, partly above the movable member 107. When it is wished to close the temple of the spectacles (the position illustrated in FIG. 5), element 104 is pivoted with respect to element 105 in the direction of arrow F1 (FIG. 4). In the course of this rotation the upper extremity of the side face 16 of element 104 is guided over the main wall 17a of element 105, until stopped by the secondary wall 17b, when the upper face 15 of element 104 is against the main wall 17a of element 105 (FIG. 5). The arm 18b of the bowl 18 is now protruding into the cavity 14 of element 104, where it is against the inner wall 32 (FIG. 2) of the element. With regard to the work of the spring 26 (FIG. 3) during this rotation of the hinge, it will be observed that the filament 109, which is not elastic, comes initially under tension, so that an apparent increase in length must be given to it by the spring 26, which it does by compressing. As it compresses, the spring 26 therefore allows the filament 109 to slide in the direction of arrow F3 (FIG. 3). The compression of the spring 26 is limited by the arrival of the stop element 38 in abutment against the end wall 33 (FIG. 3) of the distal part 21. After this, the cam action of the surfaces of the rigid elements 104 and 105 leads to a reduction in the stress experienced by the filament 109, which has to travel a shorter distance, which reduction is also made possible by the pivoting and displacement of the movable member 107 in the plane of rotation, throughout this rotation, until an angle of approximately 45° is formed with respect to the longitudinal axes of the rigid elements 104 and 105. The apparent extra length of the filament 109 is therefore absorbed by a corresponding expansion of the spring 26, which thus tends to return to its rest position.

Figure 6:
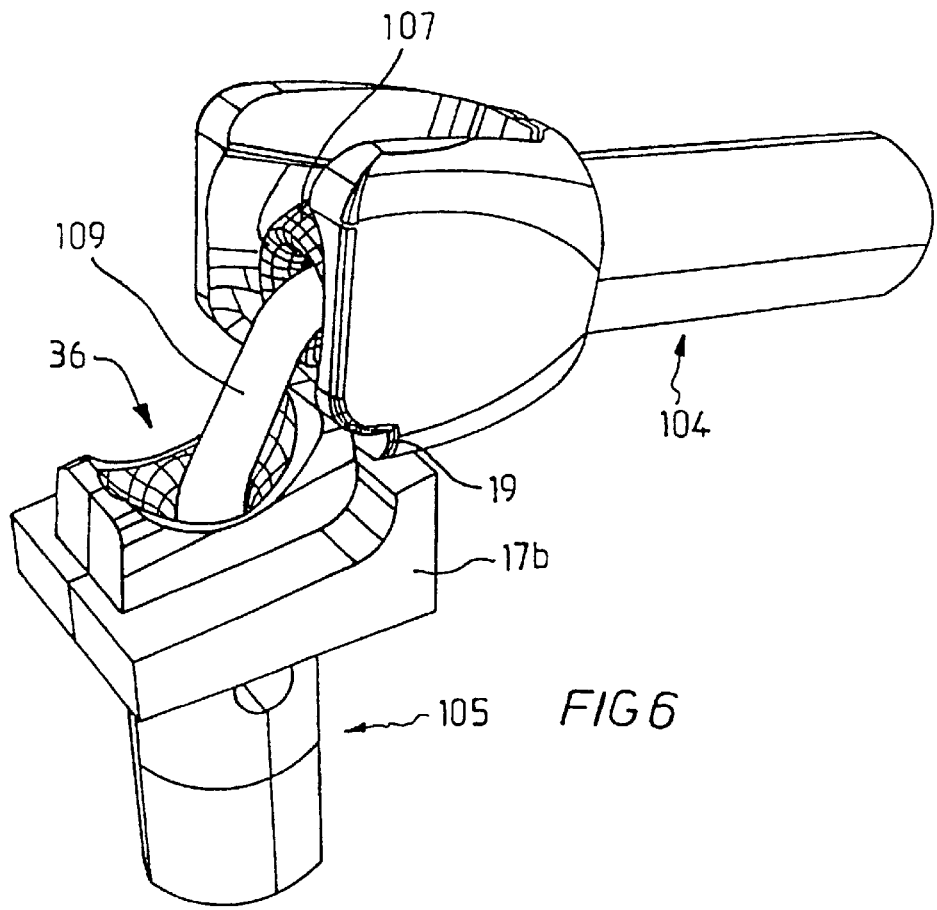
FIG. 6 is a perspective view of the system shown in FIG. 3, with the temple shown in one extreme open position.

If it is now wished to pivot the hinge from the position illustrated in FIG. 4 to the position shown in FIG. 6, in which the spectacle temple to which the rigid element 104 is connected is in an extreme position in which it is a further 90° open compared with the normal open position, in the normal plane of rotation of the hinge, that is to say the temple is open to 180°, all that is required is to rotate rigid element 104 through 90° in direction F2 (FIG. 4) relative to rigid element 105. During this rotation the free end of the secondary wall 17b of element 105 which, in the normal open position, was in abutment against the cutout 19 formed in element 104, pivots through 90° over the said cutout 19 until the secondary wall 17b and the cutout 19 are abutted against each other in a second position of abutment, as illustrated in FIG. 6.

Figure 7:
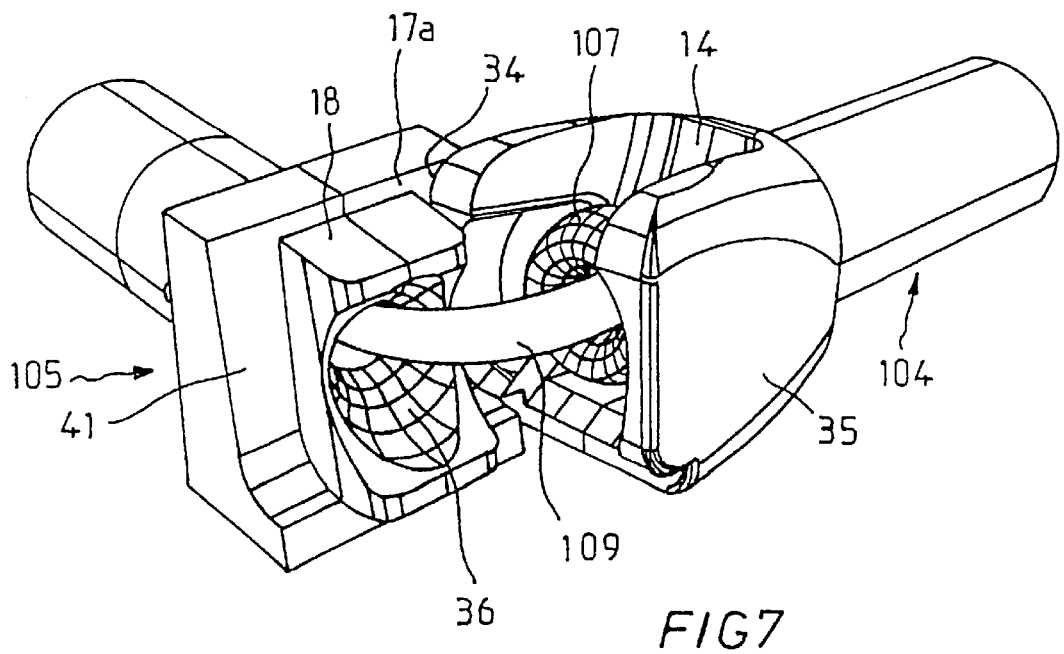
FIG. 7 is a perspective view of the system shown in FIG. 3; with the temple in a second extreme open position.

FIG. 7 shows another extreme open position of the spectacle temple, in which the rigid elements 104 and 105 form a relative angle of 90° in the plane perpendicular both to the normal plane of rotation of the hinge and to the plane of the lenses of the spectacles. The side face 34 of rigid element 104 is abutted against part of the main wall 17a of element 105 which is adjacent to a longitudinal edge of the base of the bowl 18. In this position the spectacle temple has pivoted 90° downwards relative to the position illustrated in FIG. 4. However, it is obvious that an extreme open position corresponding to an upward pivoting of 90° can also be produced, with the side face 35 of element 104 coming into abutment against another part, 41, of the main wall 17a which is adjacent to the other longitudinal edge of the base of the bowl 18.

In the positions shown in FIGS. 6 and 7, the tension has been increasingly applied to the filament 109, so that the spring 26 has been compressed in a corresponding manner, until the stop element 38 is in abutment against the end wall 33 (FIG. 3). The spring's tendency after this is to expand in order to regain its rest position; the rigid elements 104 and 105 therefore occupy an unstable relative angular position.

Although the movable member 107 is contained within the cavity 14 formed in the rigid element 104 in FIGS. 6 and 7, it should be pointed out that it could equally well be located anywhere along the line of the elongate component, between the rigid elements 104 and 105, inasmuch as it is capable of moving in the plane of rotation of the hinge, the main purpose of the invention being to give effective guidance and protection to the elongate component during the operation of the hinge and to orientate the transmitted elastic load; doing this, moreover, even as far as extreme open positions of the hinge, which, as was seen above, can be as much as 90° or more in two orthogonal planes of rotation.

What is claimed is:

1. A hinge comprising:
    two rigid elements connected to each other by a joint enabling them to occupy different relative angular positions, and
    an elongate component consisting of a filament or a tube having a substantially cylindrical cross-section, laid along two successive channels positioned end-to-end and formed one in each of the rigid elements, said elongate component comprising a material having elastic properties,
    the hinge further comprising, situated between the rigid elements, a protecting and guiding member for said elongate component, said member being movable in rotation and translation in a plane parallel to a rotation plane of the joint and containing a passage suitable for accommodating said elongate component; and
    said passage being shaped essentially like the inner part of a torus, of circular or elliptical cross-section, whose meridian circles have a radius that is at most equal to the minimum radius of curvature of the elongate component in the vicinity of the open ends of said passage.

2. A hinge according to claim 1, wherein the movable member is free to move in two orthogonal planes each of which is parallel to a plane of rotation of the said joint.

3. A hinge according to claim 1, wherein the channels each open into a cavity formed in the ends of the rigid elements, said cavities being opposite each other, and wherein the ends of the rigid elements have mating forms so that, when the rigid elements are engaged with each other, the mating forms of their ends fit together, and the movable member fits inside these ends.

4. A hinge according to claim 1, wherein the channels each open into a cavity formed in the ends of the rigid elements, said cavities being opposite each other, and wherein the ends of the rigid elements have mating forms so that, when the rigid elements are engaged with each other, the mating forms of their ends fit together, and the movable member fits inside these ends, the ends of the said rigid elements being furthermore so configured as to produce a cam action during the relative angular movement of the rigid elements in a plane of rotation of the joint.

5. A hinge according to claim 1, wherein at least one of the rigid elements is provided with stop means that limit the relative angular movements of the rigid elements in at least one plane of rotation of the joint.

6. A hinge according to claim 1, wherein the elongate component is an elastic filament, each of whose ends is anchored in one of the rigid elements.

7. A hinge according to claim 1, wherein the elongate component is a filament or a tube composed of an inelastic flexible material associated with at least one elastic part, and wherein the filament or tube is immobilized by stop parts provided one in each of the rigid elements.

8. A hinge according to claim 1, wherein the rigid elements are connected by a mechanical, electrical, hydraulic, pneumatic or optical connection.

9. A hinge according to claim 1, wherein the rigid elements are respective integral parts of a spectacle frame temple and a spectacle frame front.

10. A hinge according to claim 1, wherein the said rigid elements are respective integral parts of a vehicle door and doorframe.

11. A spectacle frame incorporating a hinge according to claim 1.

* * * * *